US011743268B2

(12) United States Patent
Coffing

(10) Patent No.: US 11,743,268 B2
(45) Date of Patent: Aug. 29, 2023

(54) FACT MANAGEMENT SYSTEM

(71) Applicant: Daniel L. Coffing, Fairfax, VA (US)

(72) Inventor: Daniel L. Coffing, Fairfax, VA (US)

(*) Notice: Subject to any disclaimer, the term of this patent is extended or adjusted under 35 U.S.C. 154(b) by 402 days.

(21) Appl. No.: 16/571,993

(22) Filed: Sep. 16, 2019

(65) Prior Publication Data

US 2020/0092301 A1   Mar. 19, 2020

Related U.S. Application Data

(60) Provisional application No. 62/731,753, filed on Sep. 14, 2018.

(51) Int. Cl.
*H04L 9/40* (2022.01)
*G06F 16/23* (2019.01)
*G06F 16/11* (2019.01)

(52) U.S. Cl.
CPC ............ *H04L 63/12* (2013.01); *G06F 16/113* (2019.01); *G06F 16/2358* (2019.01); *G06F 16/2365* (2019.01); *H04L 63/08* (2013.01)

(58) Field of Classification Search
CPC ....... H04L 63/12; H04L 63/08; H04L 63/126; H04L 9/3239; H04L 9/50; G06F 16/113; G06F 16/2358; G06F 16/2365; G06F 16/215; G06F 21/645
See application file for complete search history.

(56) References Cited

U.S. PATENT DOCUMENTS

| | | | |
|---|---|---|---|
| 6,347,332 B1 | 2/2002 | Malet et al. | |
| 6,647,400 B1* | 11/2003 | Moran | H04L 63/12 |
| | | | 713/168 |
| 6,678,828 B1* | 1/2004 | Pham | H04L 67/1097 |
| | | | 726/4 |
| 7,509,572 B1 | 3/2009 | Melander | |
| 8,438,142 B2 | 5/2013 | Wu et al. | |
| 8,538,743 B2 | 9/2013 | Gago et al. | |
| 9,047,283 B1 | 6/2015 | Zhang et al. | |
| 9,565,175 B1* | 2/2017 | Saylor | H04L 67/02 |
| 9,643,722 B1* | 5/2017 | Myslinski | G06K 9/00711 |

(Continued)

FOREIGN PATENT DOCUMENTS

| | | |
|---|---|---|
| CN | 106611055 | 5/2017 |
| EP | 1 352 338 | 10/2003 |

(Continued)

OTHER PUBLICATIONS

U.S. Appl. No. 16/563,461, Daniel L. Coffing, System for Providing Dialogue Guidance, filed Sep. 6, 2019.

(Continued)

*Primary Examiner* — Aravind K Moorthy

(74) *Attorney, Agent, or Firm* — Polsinelli LLP

(57) ABSTRACT

Systems and methods for fact management are provided. Such system may include a storage repository may hold evidence data that includes citable, digital information. Further, an evidence certification process may be executed to determine veracity of the evidence data. Meanwhile, a credentialing process may be executed to record a history associated with the evidence data. Such history may include a history of one or more users. A source monitoring process may be executed to detect historical changes to evidence data, which may be recorded by the credentialing process.

23 Claims, 7 Drawing Sheets

(56) References Cited

U.S. PATENT DOCUMENTS

| | | | |
|---|---|---|---|
| 9,652,113 B1 | 5/2017 | Colson et al. | |
| 9,916,538 B2 | 3/2018 | Zadeh et al. | |
| 9,998,470 B1* | 6/2018 | Hockings | G06F 21/556 |
| 10,075,439 B1* | 9/2018 | Mullens | H04L 63/126 |
| 10,134,072 B2* | 11/2018 | Phillips | G06Q 20/123 |
| 10,326,748 B1* | 6/2019 | Brisebois | G06F 21/31 |
| 10,346,542 B2 | 7/2019 | Wooters | |
| 10,395,216 B2 | 8/2019 | Coffing et al. | |
| 10,437,791 B1* | 10/2019 | Bebchuk | G06F 16/1734 |
| 10,467,194 B2* | 11/2019 | Strong | G06F 16/168 |
| 11,023,601 B2* | 6/2021 | Quint | H04L 63/08 |
| 11,042,711 B2 | 6/2021 | Coffing | |
| 11,170,092 B1* | 11/2021 | Liang | H04L 9/0637 |
| 11,429,794 B2 | 8/2022 | Coffing | |
| 2003/0014311 A1 | 1/2003 | Chua | |
| 2003/0084425 A1 | 5/2003 | Glaser | |
| 2003/0088783 A1* | 5/2003 | DiPierro | H04L 63/0428 |
| | | | 713/176 |
| 2004/0078726 A1* | 4/2004 | Little | G06N 5/00 |
| | | | 714/48 |
| 2005/0251452 A1* | 11/2005 | Roever | G06Q 20/382 |
| | | | 705/27.1 |
| 2005/0278529 A1* | 12/2005 | Kano | H04L 63/101 |
| | | | 713/168 |
| 2006/0122834 A1 | 6/2006 | Bennett | |
| 2006/0200259 A1 | 9/2006 | Hoffberg et al. | |
| 2008/0140491 A1 | 6/2008 | Jain et al. | |
| 2008/0222279 A1 | 9/2008 | Cioffi et al. | |
| 2009/0100053 A1 | 4/2009 | Boschee et al. | |
| 2009/0100131 A1* | 4/2009 | Lerner | H04L 63/0815 |
| | | | 709/203 |
| 2009/0117883 A1 | 5/2009 | Coffing et al. | |
| 2009/0144302 A1 | 6/2009 | Baldwin | |
| 2009/0192968 A1 | 7/2009 | Tunstall-Pedoe | |
| 2009/0234958 A1 | 9/2009 | Lee | |
| 2009/0326919 A1 | 12/2009 | Bean | |
| 2010/0030744 A1* | 2/2010 | DeShan | G06F 16/168 |
| | | | 715/764 |
| 2010/0063799 A1 | 3/2010 | Jamieson | |
| 2010/0088262 A1 | 4/2010 | Visel et al. | |
| 2010/0242023 A1* | 9/2010 | Han | G06F 21/12 |
| | | | 717/124 |
| 2011/0071978 A1* | 3/2011 | Lottridge | G06Q 10/10 |
| | | | 706/54 |
| 2011/0320396 A1 | 12/2011 | Hunt et al. | |
| 2011/0320450 A1* | 12/2011 | Liu | G06F 16/9537 |
| | | | 707/737 |
| 2012/0030729 A1 | 2/2012 | Schwartz et al. | |
| 2012/0066493 A1* | 3/2012 | Widergren | H04L 63/0428 |
| | | | 713/160 |
| 2012/0166373 A1 | 6/2012 | Sweeney et al. | |
| 2012/0226646 A1* | 9/2012 | Donoho | G06F 16/958 |
| | | | 706/46 |
| 2013/0179386 A1 | 7/2013 | Schindler | |
| 2013/0198521 A1* | 8/2013 | Wu | H04L 9/3263 |
| | | | 713/175 |
| 2013/0205362 A1* | 8/2013 | Kiehtreiber | G06F 21/51 |
| | | | 726/1 |
| 2013/0291085 A1* | 10/2013 | Chong | G05B 19/048 |
| | | | 726/10 |
| 2014/0053227 A1* | 2/2014 | Ruppin | G06F 21/128 |
| | | | 726/1 |
| 2014/0172417 A1 | 6/2014 | Monk et al. | |
| 2014/0181053 A1* | 6/2014 | Belanger | G06F 16/176 |
| | | | 707/687 |
| 2014/0188462 A1 | 7/2014 | Zadeh | |
| 2014/0201126 A1 | 7/2014 | Zadeh et al. | |
| 2014/0282921 A1* | 9/2014 | Filman | H04L 63/08 |
| | | | 726/5 |
| 2014/0297252 A1 | 10/2014 | Prasad et al. | |
| 2014/0343984 A1* | 11/2014 | Shahabi | G06Q 10/06311 |
| | | | 705/7.13 |
| 2014/0358657 A1 | 12/2014 | Smullen et al. | |
| 2015/0066479 A1 | 3/2015 | Pasupalak et al. | |
| 2015/0195406 A1 | 7/2015 | Dwyer et al. | |
| 2015/0227364 A1* | 8/2015 | Asadullah | G06F 8/751 |
| | | | 717/120 |
| 2015/0293897 A1* | 10/2015 | Myslinski | G06Q 10/06 |
| | | | 707/755 |
| 2016/0041976 A1* | 2/2016 | Pradeep | G06F 16/2358 |
| | | | 707/695 |
| 2016/0063993 A1 | 3/2016 | Dolan et al. | |
| 2016/0078339 A1 | 3/2016 | Li et al. | |
| 2016/0148159 A1 | 5/2016 | Coffing | |
| 2016/0180238 A1 | 6/2016 | Alboszta et al. | |
| 2016/0196342 A1* | 7/2016 | Kim | G06F 40/194 |
| | | | 707/728 |
| 2016/0277373 A1* | 9/2016 | Murray | H04L 9/0637 |
| 2016/0292289 A1* | 10/2016 | Milvaney | G06F 3/0484 |
| 2016/0292432 A1* | 10/2016 | Seo | G06F 21/568 |
| 2016/0306800 A1 | 10/2016 | Son et al. | |
| 2016/0350278 A1 | 12/2016 | Aharoni et al. | |
| 2017/0024551 A1* | 1/2017 | Phadke | G06F 21/16 |
| 2017/0070841 A1* | 3/2017 | Shalunov | H04W 4/60 |
| 2017/0075922 A1* | 3/2017 | Torman | G06F 16/1805 |
| 2017/0094364 A1* | 3/2017 | Karim | H04N 21/2743 |
| 2017/0132207 A1 | 5/2017 | Goldstein et al. | |
| 2017/0132596 A1* | 5/2017 | Whiffen | G06Q 20/1235 |
| 2017/0193004 A1* | 7/2017 | Karuppusamy | G06F 16/184 |
| 2017/0232300 A1 | 8/2017 | Tran et al. | |
| 2017/0264640 A1* | 9/2017 | Narayanaswamy | |
| | | | H04L 63/0281 |
| 2017/0277993 A1 | 9/2017 | Beaver et al. | |
| 2017/0289120 A1* | 10/2017 | Kohli | H04L 63/08 |
| 2017/0330285 A1* | 11/2017 | Ehrhart | G06F 3/0482 |
| 2017/0371861 A1 | 12/2017 | Barborak et al. | |
| 2018/0004718 A1 | 1/2018 | Pappu et al. | |
| 2018/0068358 A1 | 3/2018 | Hoffberg et al. | |
| 2018/0082076 A1* | 3/2018 | Murray | H04L 63/10 |
| 2018/0083893 A1 | 3/2018 | Viswanathan et al. | |
| 2018/0139222 A1* | 5/2018 | Wan | H04L 63/1425 |
| 2018/0173203 A1* | 6/2018 | Freer | G06F 21/44 |
| 2018/0174020 A1 | 6/2018 | Wu et al. | |
| 2018/0181973 A1* | 6/2018 | Lynch | G06Q 10/06315 |
| 2018/0183852 A1 | 6/2018 | Jackson et al. | |
| 2018/0189504 A1* | 7/2018 | Ghafourifar | G06F 21/6209 |
| 2018/0189732 A1 | 7/2018 | Kozloski et al. | |
| 2018/0196796 A1 | 7/2018 | Wu et al. | |
| 2018/0204111 A1 | 7/2018 | Zadeh et al. | |
| 2018/0218176 A1 | 8/2018 | Voorhees et al. | |
| 2018/0293224 A1 | 10/2018 | Bostick et al. | |
| 2018/0307673 A1 | 10/2018 | Akkiraju et al. | |
| 2018/0308094 A1* | 10/2018 | Jayaram | G06Q 20/3827 |
| 2018/0336286 A1* | 11/2018 | Shah | G06F 16/182 |
| 2019/0013038 A1 | 1/2019 | Thomson et al. | |
| 2019/0050445 A1* | 2/2019 | Griffith | G06F 16/2365 |
| 2019/0068367 A1* | 2/2019 | Baughman | G06F 21/32 |
| 2019/0073914 A1* | 3/2019 | Contractor | G09B 5/06 |
| 2019/0080022 A1* | 3/2019 | Matsuo | G06F 16/215 |
| 2019/0080392 A1* | 3/2019 | Youb | G06F 21/64 |
| 2019/0129974 A1* | 5/2019 | Choi | G06F 16/168 |
| 2019/0180255 A1* | 6/2019 | Deshpande | G06Q 20/322 |
| 2019/0180867 A1 | 6/2019 | Carbonell et al. | |
| 2019/0205219 A1* | 7/2019 | Graham | G06F 11/00 |
| 2019/0205381 A1 | 7/2019 | Raux et al. | |
| 2019/0213344 A1* | 7/2019 | Hesketh | G06F 21/6218 |
| 2019/0272383 A1* | 9/2019 | Luttwak | G06F 21/604 |
| 2019/0294759 A1* | 9/2019 | Whiffen | G06F 21/105 |
| 2019/0303522 A1* | 10/2019 | Green | G06F 30/39 |
| 2019/0354389 A1* | 11/2019 | Du | G06F 9/45558 |
| 2019/0370335 A1 | 12/2019 | Coffing | |
| 2019/0377901 A1 | 12/2019 | Balzer et al. | |
| 2019/0392393 A1 | 12/2019 | Coffing | |
| 2020/0004946 A1* | 1/2020 | Gilpin | H04L 63/10 |
| 2020/0026772 A1 | 1/2020 | Wheeler | |
| 2020/0034548 A1* | 1/2020 | Wu | G06F 21/64 |
| 2020/0042721 A1* | 2/2020 | Castinado | H04L 9/0637 |
| 2020/0042864 A1* | 2/2020 | Nguyen | H04W 84/18 |
| 2020/0073922 A1 | 3/2020 | Coffing | |
| 2020/0074117 A1* | 3/2020 | Camenisch | G06F 21/64 |
| 2020/0081987 A1 | 3/2020 | Coffing | |
| 2020/0143242 A1 | 5/2020 | Lafontaine | |

(56) References Cited

U.S. PATENT DOCUMENTS

| | | | |
|---|---|---|---|
| 2020/0159928 A1* | 5/2020 | Herrin | G06F 16/1805 |
| 2020/0159946 A1* | 5/2020 | Castinado | H04L 63/10 |
| 2020/0175961 A1 | 6/2020 | Thomson et al. | |
| 2020/0184278 A1 | 6/2020 | Zadeh et al. | |
| 2020/0192872 A1* | 6/2020 | Quinn | G06F 16/14 |
| 2020/0193019 A1* | 6/2020 | Tietz | G06F 21/552 |
| 2020/0195441 A1* | 6/2020 | Suen | H04L 9/3236 |
| 2020/0204376 A1* | 6/2020 | Nandakumar | H04L 9/3231 |
| 2021/0035094 A1* | 2/2021 | Ozaki | G06Q 10/10 |
| 2021/0081212 A1* | 3/2021 | Pestana | G06F 11/3476 |
| 2021/0383071 A1 | 12/2021 | Coffing | |
| 2022/0222241 A1 | 7/2022 | Coffing | |

FOREIGN PATENT DOCUMENTS

| | | |
|---|---|---|
| EP | 3 769 238 | 1/2021 |
| EP | 3 847 643 | 7/2021 |
| EP | 3 850 781 | 7/2021 |
| WO | WO 2014/146086 | 9/2014 |
| WO | WO 2017/106792 | 6/2017 |
| WO | WO 2017/222738 | 12/2017 |
| WO | WO 2019/183144 | 9/2019 |
| WO | WO 2020/051500 | 3/2020 |
| WO | WO 2020/056409 | 3/2020 |
| WO | WO 2020/086155 | 4/2020 |
| WO | WO 2022/155370 | 7/2022 |
| WO | 2022/197938 A1 | 9/2022 |

OTHER PUBLICATIONS

PCT/US19/50020, System for Providing Dialogue Guidance, Sep. 6, 2019.
PCT/US19/51294, Fact Management System, Sep. 16, 2019.
U.S. Appl. No. 16/559,519, Daniel L. Coffing, System and Method for Vocabulary Alignment, filed Sep. 3, 2019.
PCT/US19/49390, PCT System and Method for Vocabulary Alignment, Sep. 3, 2019.
PCT Application No. PCT/US2019/050020 International Preliminary Report on Patentability dated Mar. 9, 2021; 6 pages.
PCT Application No. PCT/US2019/051294 International Preliminary Report on Patentability dated Mar. 9, 2021; 6 pages.
PCT Application No. PCT/US2019/049390 International Preliminary Report on Patentability dated Mar. 2, 2021; 4 pages.
U.S. Appl. No. 16/553,032 Office Action dated Mar. 29, 2021.
U.S. Appl. No. 16/563,461 Office Action dated Mar. 12, 2021.
PCT Application No. PCT/US2014/031031 International Preliminary Report On Patentability dated Sep. 15, 2015; 5 pages.
PCT Application No. PCT/US2019/023034 International Preliminary Report On Patentability dated Sep. 22, 2020; 10 pages.
U.S. Appl. No. 16/358,757 Office Action dated Sep. 21, 2020.
U.S. Appl. No. 16/559,519 Office Action dated Nov. 16, 2020.
PCT Application No. PCT/US2019/049390 International Search Report and Written Opinion dated Apr. 8, 2020.
Katzav et al.; "A Classification System for Arguments", 2012 [retrieved on Aug. 6, 2014] Retrieved from the internet <URL: http://www.arg.dundee.ac.uk/people/chris/publications/2004/ClassifyingArguments.pdf>. Entire document.
Pinto; "The Account of Warrants in Bermejo-Luque's Giving Reasons." 2011. [retrieved on Aug. 6, 2014], Retrieved from the Internet:<URL: http://www.ehu.es/ojs/index.php/THEORIA/article/viewFile/2950/2634>. Entire document.
Simosi, Maria; Using Toulmin's Framework for the Analysis of Everyday Argumentation: Some Methodological Considerations. 2003. [retrieved on Aug. 6, 2014] Retrieved from the Internet:<URL:http://www.syros.aegean.gr/users/simosi/simosi_webpage_files/toulmin.pdf>. entire document.
Trzesicki, Kazimierz; Arguments and their Classification. 2011. [retrieved on Aug. 6, 2014], Retrieved from the Internet:<URL:http://logika.uwb.edu/pl/studies/download/php?volid=36&artid=kt>. Entire document.
Wyner, Adam; "Multi-Modal Multi-threaded Online Forums", 2009, Google, 9 pages.
PCT Application No. PCT/US2014/031031 International Search Report and Written Opinion dated Aug. 25, 2014.
PCT Application No. PCT/US2019/023034 International Search Report and Written Opinion dated Jun. 21, 2019.
PCT Application No. PCT/US2019/050020 International Search Report and Written Opinion dated Dec. 18, 2019.
PCT Application No. PCT/US2019/051294 International Search Report and Written Opinion dated Jan. 22, 2020.
U.S. Appl. No. 14/897,253 Final Office Action dated Jan. 23, 2019.
U.S. Appl. No. 14/897,253 Office Action dated Feb. 26, 2018.
U.S. Appl. No. 16/563,461 Final Office Action dated Aug. 2, 2021.
U.S. Appl. No. 16/559,519 Final Office Action dated May 24, 2021.
U.S. Appl. No. 16/553,032 Final Office Action dated Sep. 29, 2021.
Galitsky et al., Boris; "Matching parse thickets for open domain question answering", Data & Knowledge Engineering, Vo. 107, Dec. 9, 2016, pp. 24-50, XP029897089, ISSN: 0169-023X, DOI: 10.1016/J.DATAK.2016.11.002.
European Application No. 19771324.1 Extended European Search Report dated Jan. 4, 2022.
U.S. Appl. No. 16/563,461 Office Action dated Dec. 21, 2021.
PCT Application No. PCT/US2022/020771 International Search Report and Written Opinion dated Jul. 7, 2022; 7 pages.
PCT Application No. PCT/US2022/0012356 International Search Report and Written Opinion dated May 3, 2022; 7 pages.
Bonomi et al., Silvia: "B-CoC: A Blockchain-based Chain of Custody for Evidences Management in Digital Forensics", Arxiv.org, Cornell University Library, Jul. 26, 2018.
Giuliani, Manuel et al.,"MuDis—A Multimodal Dialogue System for Human-Robot Interaction", Proceedings of The International Workshop on Cognition for Technical Systems 2008 (Oct. 30, 2008), pp. 1-6.
European Application No. 19857648.0 Extended European Search Report dated Mar. 21, 2022.
European Application No. 19860927.3 Extended European Search Report dated Apr. 7, 2022.
U.S. Appl. No. 16/559,519 Office Action dated Mar. 16, 2022.
International Search Report and Written Opinion issued for International Application No. PCT/US2022/0012356 dated May 3, 2022 (7 pages).
International Search Report and Written Opinion issued for International Application No. PCT/US2022/020771 dated Jul. 7, 2022 (7 pages).
Office Action issued for U.S. Appl. No. 16/553,032 dated Aug. 15, 2022 (31 pages).
Office Action issued for U.S. Appl. No. 17/353,516 dated Dec. 27, 2022 (77 pages).

* cited by examiner

| CONTENT TYPE 162 | | | | | | |
|---|---|---|---|---|---|---|
| LAYER_CONTENT 164 | CROSSREFERENCES_ID 166 | METADATA 168 | | | | |
| | SOURCE_ID 170 | | | | | |
| | EDITOR_ID 172 | | | | | |
| | LOGICVALIDATOR_ID 174 | | | | | |
| WORKLOAD_ID 176 | WORKLOADPROCESS_ID 178 | WORKLOADCOMPLETIONDATE 180 | | | | |
| ... | | | | | | |

FACT MANAGEMENT SYSTEM

CROSS-REFERENCE TO RELATED APPLICATIONS

The present patent application claims the priority benefit of U.S. provisional patent application 62/731,753 filed Sep. 14, 2018, the disclosure of which is incorporated by reference herein.

BACKGROUND OF THE INVENTION

1. Field of the Invention

The present invention relates to file management. In particular, the present invention relates to managing sources and digital citations within a trusted storage repository.

2. Description of the Related Art

There are myriad sources of information, and it is often challenging to verify a source or reference that is brought up in discussion. Further, because digital sources may often be updated or edited after the fact, there is no guarantee that a source referenced for support at one point in time will continue to support the same argument or position at a later point. Further, it is difficult and impractical to audit a referenced source for authenticity, support or dispute of the source, changes to the source over time, and other historical and/or contextual elements to a source which impact its value and/or relevance (e.g., acceptance within a community or by particular persons, consistency with other sources, credibility of the source and/or those supporting or disputing it, context of the source, etc.) to its referencing counterpart. In particular, as technologies and opportunities to manufacture fake content (e.g., falsified sources, fake facts, etc.) have increased, the number of evidence properties that can be examined has also increased such as evidence types, degrees, and interrelationships.

It is with these observations in mind, among others, that aspects of the present disclosure were concerned and developed.

SUMMARY OF THE CLAIMED INVENTION

Embodiments of the present invention may include systems and methods for fact management. Such system may include a storage repository may hold evidence data that includes citable, digital information. Further, an evidence certification process may be executed to determine veracity of the evidence data. Meanwhile, a credentialing process may be executed to record a history associated with the evidence data. Such history may include a history of one or more users. A source monitoring process may be executed to detect historical changes to evidence data, which may be recorded by the credentialing process.

BRIEF DESCRIPTION OF THE DRAWINGS

FIG. 1D illustrates an exemplary data packet that may be used in systems for managing and certifying facts in accordance with some embodiments of the subject technology.

DETAILED DESCRIPTION

Figure 1A:
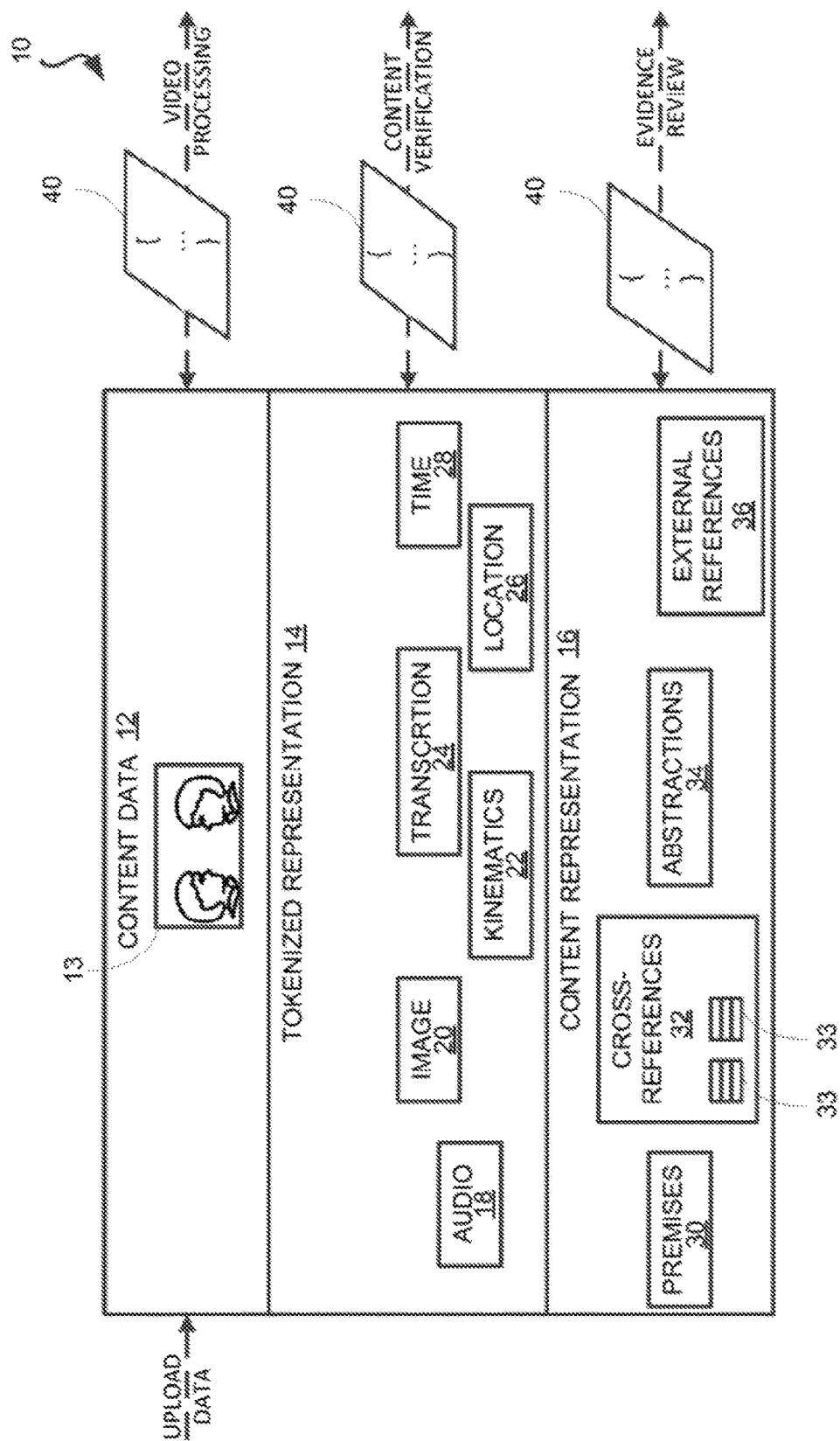
FIG. 1A illustrates a multilayer abstraction for representing evidence according to some embodiments of the subject technology.

Embodiments of the present invention may include systems and methods for fact management. Such system may include a storage repository may hold evidence data that includes citable, digital information. Further, an evidence certification process may be executed to determine veracity of the evidence data. Meanwhile, a credentialing process may be executed to record a history associated with the evidence data. Such history may include a history of one or more users. A source monitoring process may be executed to detect historical changes to evidence data, which may be recorded by the credentialing process Aspects of the present disclosure involve systems for managing facts and, in particular, sources, citations, and other fact references or discrete premises. In one example, a system may manage any data that can be sourced and/or cited digitally by providing user-based credentialing, certification, and navigation of sources. In particular, a flexible data store can store facts and/or argument structures composed of sources and digital citations.

In some examples, an evidence certification system can be linked to the flexible data store in order to provide curated, citable references for use in debate, discussion, and other forms of dialogue. Such citable references may be associated with a source that has been previously approved (e.g., by one or more curators). In particular, facts and sources can be managed in a cooperative and distributed fashion to allow for efficient auditing of an immutable historical record for a source and its content throughout the publication lifecycle. Facts and sources can be verified at multiple levels of abstraction and the content verification can be performed by various subsystems and processes. As a result, time taken for validating or fact checking premises and sources can be reduced and new avenues of rhetoric analysis and the like can be explored. Further, smart contracts and the like can be used to provide automated source disclosure at a highly granular level directly within the immutable historical record. Said another way, just as logistic and sourcing processes can be recorded and audited by an immutable historical record (e.g., a blockchain), so too can premises, ideas, and facts.

Certified evidence (e.g., facts, premises, and other digital fact elements, etc.) can be provided for use as various kinds of support and for various citation formats. Certifying evidence may include multiple content verification processes (discussed below) for providing assurance that a piece of evidence is what it purports to be. Importance rankings can be assigned to evidence by the evidence certification system for use in downstream processing. For example, video favorability can be based on voice print analysis, facial recognition, kinematic analysis, and other feature analytics of evidence to be certified.

The greater a complexity of a piece of evidence, and so the more analytic tools that can be (and are) applied to it, the higher the favorability of the evidence may become. Additionally, evidence certification or favorability can include calculation based on authorities (e.g., users, participants, etc.) providing "approval" or support for the respective evidence. As a result, sources including a higher number of participants or authorities providing corroboration or otherwise validating, greater specificity (e.g., narrower in scope), more attributes (e.g., greater complexity), a longer historical record and/or more consistency to other evidence having a historical record, may have a higher favorability as compared to other evidence.

The certified evidence may be underpinned by a multi-layered representation of evidence including, for example, (1) a digital structure of the evidence (e.g., a file, stream, etc.), (2) a tokenized representation of the evidence including various capture components contributing to the complexity of the evidence (e.g., audio, video, tactile, kinetic, chemical/molecular, etc.), and (3) a content representation layer including an abstraction of the content of the evidence. For example, the content representation layer may include an indicator for associated evidence linking it to a speech spoken by a particular person and including semantic content relating to a stance on domestic trade practice. While the example is at one level of abstraction, it is understood that the content representation layer may be as granular as desired (e.g., can include activity and/or object representations, mental constructs and interactions such as symbols, transactions, metaphysical interactions, etc.).

In some examples, the multilayered representation may be used for downstream treatment based on information in or across respective layers (e.g., for internal processing or as output via API and the like). For example, a simplified validity value (e.g., akin to a credit rating, etc.) may be generated through downstream processes. Additionally, the layers may be nested within one or more layers of another multilayered representation of evidence. For example, a video of a speech may include a multilayered representation of the speech within the multilayered representation of the video and the representations can be directly nested (e.g., as a recursive data structure, etc.) or via cross-references stored within a respective representation layer (e.g., memory address pointer, hash address pointer, hyperlink, etc.). In some examples, the multilayered representation can be used to identify relevant evidence to users during an analysis of user arguments (e.g., during a coached dialogue, etc.). Vulnerabilities in an argument which are related to stored evidence (e.g., evidence which may repair the argument vulnerability or evidence which may undercut the argument and be itself a vulnerability) can be identified by downstream processes and the associated evidence can be provided directly to a user.

FIG. 1A illustrates a three layer representation 10 of submitted evidence. A content data layer 12 receives, or is generated by, uploaded data from a user. Content data layer 12 includes raw content such as a video 13 of dialogue between two participants (e.g., a recorded interview, etc.). Content data layer 12 may be retrieved and processed by evidence certification and/or verification services (discussed below) or intake services and the like. Here, a video processing service retrieves content data layer 12.

A tokenized representation layer 14 may be generated based on content data layer 12 and video 13 contained within that layer. In some examples, tokenized representation layer 14 may be generated by video processing (where appropriate) services and the like. Tokenized representation layer 14 can include data for audio 18, image 20, kinematics 22, transcription 24, location 26, time 28, and other metadata components and the like. Contents of tokenized representation layer 14 can be used for content verification (e.g., perform kinematic analysis on kinematics 22, check location 26 and/or time 28 against similar data in other evidence that may conflict or support, etc.).

A content representation layer 16 can be produced from, or along with, tokenized representation layer 14 and content data layer 12. Content representation layer 16 includes data representing abstracted information related to content data layer 12. For example, content representation layer 16 can include discretized premises 30 identified from data in other layers, cross-references 32 which can associate three layer representation 10 of video 13 with other three layer representations 33 of uploaded evidence data, discrete abstractions 34, and external references 36 to associate three layer representation 10 with external content on, for example, the web.

In some examples, a validation data packet 40 can include various fields for performing and/or completing various content verification or evidence validation/certification processes. Validation data packet 40 may be structured as follows:

```
{
    sourceID:"content1"
    editorID:"user1"
    publicationchannelID:"publisher1"
    logicvalidatorID:"fallacy-check"
    rating:"high"
    ratingDate:"01-01-2018"
}
```

In particular, validation data packet 40 may correspond to data within layers 12, 14, or 16 (or nested three layer representations 33) and identifies a source for a piece of evidence to be verified. An editor identification field describes who is performing the verification (e.g., providing compute power, manually reviewing, etc.) and a publication channel denotes to where verification may be provided once complete. Further, the particular method of verification, here a check against various fallacies, may be included as well. While verification method here is a check against fallacies, various methods may be used based on the layer from which the validation data packet originates, verifier preference (e.g., manual checking of data, lending compute to a particular processes, etc.), or the particular component being verified (e.g., external reference 36 may be verified via different methods than premises 30, etc.). A calculated rating and rating date may also be stored within validation data packet 40.

Various systems can provide processes related to certification or content verification and may be performed by a central service or as a distributed workload (e.g., a "mining" operation, etc.) performed in whole or part by users and other participant (e.g., blockchain nodes, etc.). For example, a source monitoring system can guard against changes to cited evidence. Alerts and notifications can be generated based on changes to a source material. In some examples, thresholds can be set for alerts and notifications based on a significance or depth of change treatment to a source.

In one example, where evidence is classified as, for example, subjective or phenomenological, increased or decreased weight may be given to certain features of the evidence. Video components may be of increased value due to increased reliability of facial identity and kinematics, voice print analysis may be utilized and/or emphasized, and other treatments.

A news falsification (e.g., a "fake news" detection) system can use heuristics and content exploration to identify fake news and/or revoke certification of evidence. Novelty, style, common appeal, network relationships, and other direct and indirect features of the evidence may be used as heuristics for identifying false news and/or references.

A plagiarism detection process can certify content as original or as properly attributed. The plagiarism detection process can identify directly copied content (e.g., verbatim copying) as well as intentionally (or unintentionally) obfuscated plagiarized content based on premises, arguments, interrelationships, and the like. The above evidence certification systems and processes can be implemented as validation workloads performed by a centralized system or, in the case of a distributed system (discussed below), performed on an opt-in basis.

Evidence and/or users may be credentialed so that time and/or reputation of a user are linked to support or use of particular references. In some examples, a blockchain-based system can be used to provide an immutable record of evidence interactions and, additionally, allow for a user history to be tracked from the evidence interactions. A blockchain-based system can provide, for example and without imputing limitation, (1) immutability and decentralization, (2) distributed and opt-in workloads (e.g., "mining" operations, etc.), (3) trustless interactions (in other words, trust among participants is intrinsic to the closed system and a priori knowledge of users between users is unnecessary to support transactions/interactions), (4) tokenization of activities (e.g., interactions such as support or dispute of evidence is recorded on the blockchain in a discrete manner), (5) encryption layers for distributing content elements, and (6) smart contract operations for providing features such as time-lagged trust and post hoc auditability based on smart contract terms, etc. Credentials of a reference may depend upon which users have indicated support for the reference along with what other references (e.g., credibility, certification, etc.) each respective supporting user has also supported. The credential blockchains may additionally be available to downstream processes for analyzing references, users, or both.

In some examples, users can explore the data store through an interactive browser or user portal. For example, and without imputing limitation, a user may explore evidence by filtering on various filter parameters (e.g., source, relevance, validity certification, persuasiveness, other abstractions related to evidence). In some cases, the user can select from the explored evidence to "deploy" it or otherwise interact or use it for dialogue or review purposes (e.g., as part of a publication, etc.). Further, relevant content may be fed to users based on analysis of user arguments (e.g., entered through an interface) run against certified evidence in the data store. Additionally, users may perform "mining" or otherwise complete workloads in order to build reputation or a credit of some sort. In some examples, a mining operation may include providing compute for validating evidence by processing layer 2 attributes of evidence on the blockchain (e.g., voice or facial recognition, type classification, kinematic analysis, etc.) or layer 3 attributes such as performing a natural language processing as described in Application No. 62/645,114, entitled "System and Method for Processing Natural Language Arguments and Propositions," hereby incorporated by reference in its entirety. In some examples, a mining operation may include other forms of content verification, including manual verification, and may require user access rights based on whether the user is an institution, reputation of the user, user history, and the like. For example, and without imputing limitation, a user may flag an image showing signs of tampering, indicate a failure to replicate a result of an experiment, dispute a "deep-fake" video or the like based on firsthand knowledge or with supporting evidence (e.g., located elsewhere on the blockchain, etc.). Through a user portal, users can apply various filters to review content related to selected subjects (e.g., entertainment, rhetorical, vetted, etc.). Various pieces of argument solution evidence can be cross-referenced so that argument can navigate between argument solution evidence related by, for example, shared factual bases, sources, participants, and the like.

Users may also review and/or comment on evidence. As discussed above, comments may be linked to user reputation via an immutable comment record for each user and/or an immutable record of user comments for each evidence item. In order to foster high quality user interaction, the user portal may include screening tests, training materials and tracking, points for good behavior, and the like.

In some examples, an API can provide integrations for third-party platforms.

Figure 1B:
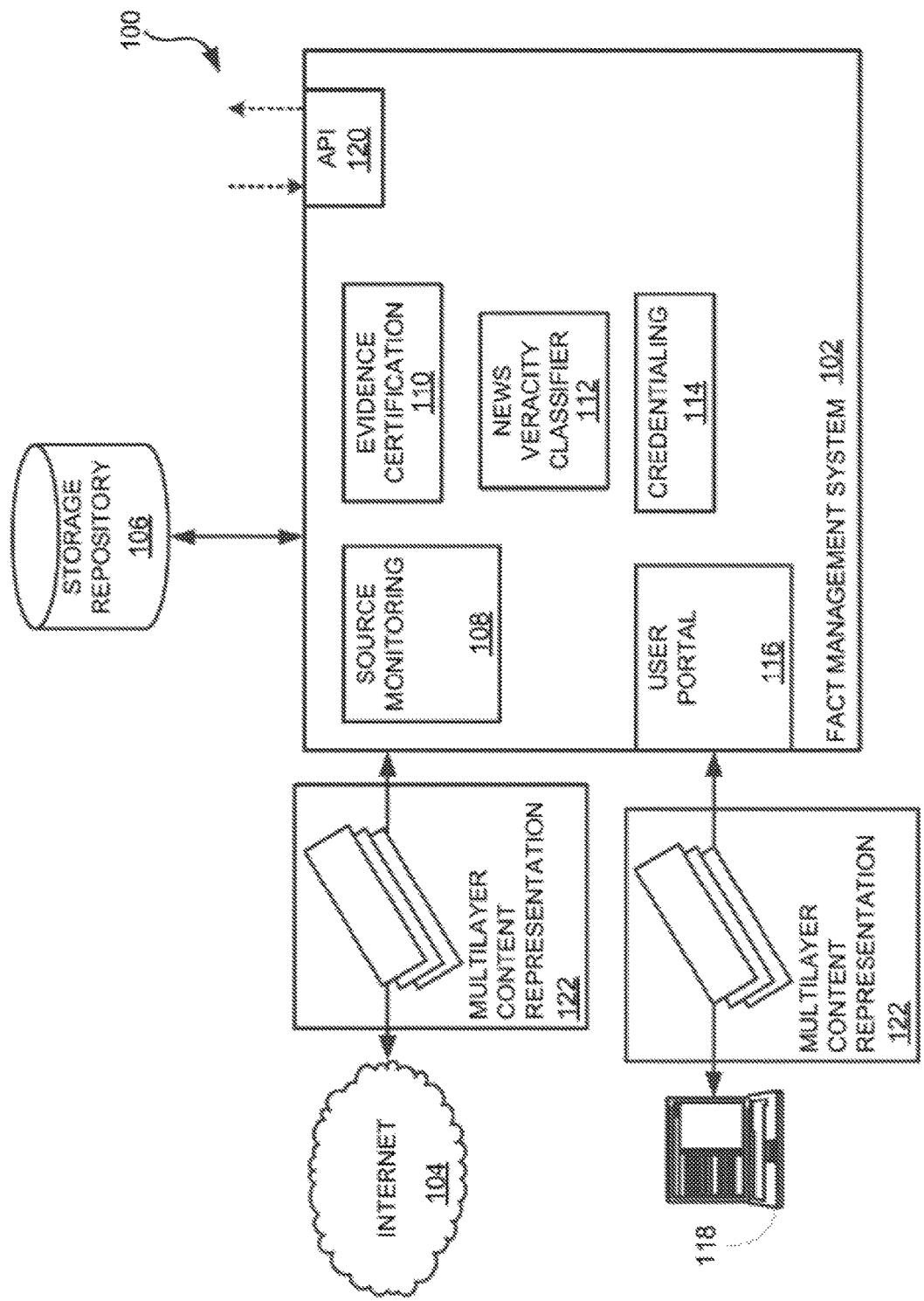
FIG. 1B is a block diagram depicting a system for managing and certifying facts according to some embodiments of the subject technology.

FIG. 1B is an operating environment 100 in which a fact management system 102 processes evidence data for storage, upkeep, and retrieval. Processed evidence data is stored in a storage repository 106 which can be either remote or local to fact management system 102. In some examples, storage repository 106 may be an abstraction including multiple, specialized storage repositories access through a shared gateway service or portal.

In particular, users may access fact management system 102 through a computer 118 via a user portal 116. Through either direction by users or through automated means (e.g., schedulers, web crawling, etc.), fact management system 102 may retrieve evidence data from the Internet 104. Evidence data may include various digital sources such as text articles, video, image, webpage, and other data referenceable as evidence in debate, discussion, or other dialogue. Evidence data may be in the form of a multilayer content representation 122 as provided to fact management system 102. In some examples, fact management system 102 automatically converts all received evidence into a multilayer content representation 122 including three layers as discussed above. Freshly converted multilayer content representation 122 includes the evidence itself (e.g., layer 1) and may also include, in part or in whole, tokenized portions of the evidence (e.g., layer 2). Fact management system 102 may fill in layers 2 and 3 automatically or via distributed "mining" operations performed by users.

A source monitoring service 108 regularly certifies/recertifies, updates, and monitors evidence data stored in storage repository 106. Source monitoring service 108 can include schedulers, user controls, and the like. Further, source monitoring service 108 may include a comparator process for identifying changes to stored sources. Source monitoring service 108 includes alerting processes which may alert users to changes to sources based on user subscription (e.g., a user may subscribe to monitoring a particular source), user use of a monitored source, and the like.

An evidence certification service 110 can perform evidence certification processes as discussed above. For example, evidence certification may include classifying evidence data and performing specialized treatment, weighting, and/or processing of the classified evidence data.

A credentialing service 114 generates respective records for users and evidence data stored in storage repository 106. User credentials may document and provide scores, rankings, and the like based on user comment history, evidence data usage, and/or other user behavior. Evidence data credentials may include a history of changes (e.g., provided by source monitoring service 108), a history of user interaction with the evidence data (e.g., which users have used the evidence data and how), and other information. In some examples, credentialing service 114 may store and manage these records on a blockchain and/or as part of a blockchain network in order to provide an immutable record.

A news veracity classifier 112 can interface with the above discussed service in order to identify false and/or misleading evidence data (e.g., "fake news", etc.). In some examples, identified false or misleading evidence data can be purged from storage repository 106. In some examples, identified false or misleading evidence data may be flagged and/or saved on another specialized data store.

Application programming interface (API) 120 provides input and output endpoints for fact management system 102. For example, API 120 may allow development of applications using data or processes of fact management system 102 such as website integrations and the like.

Figure 1C:
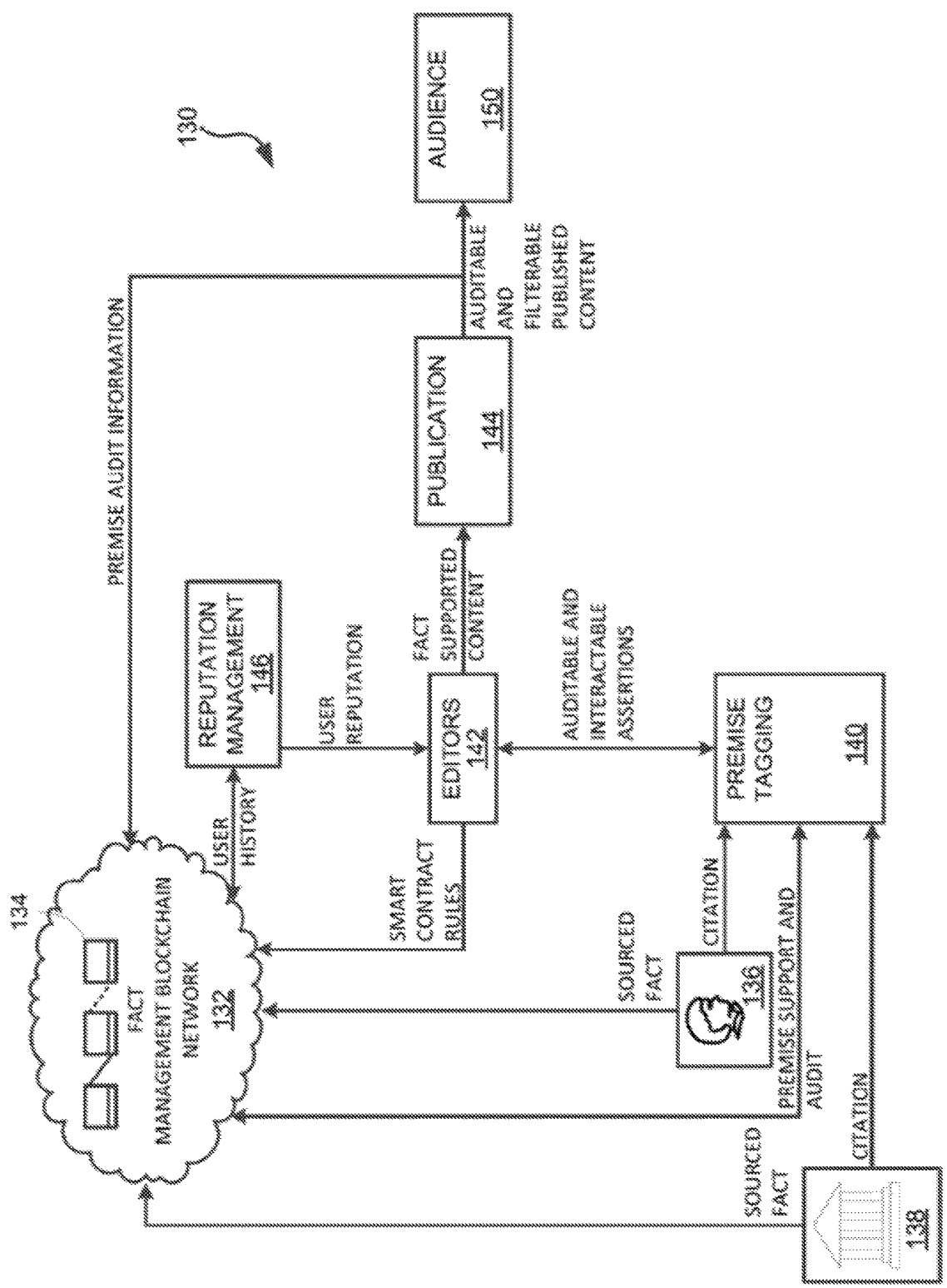
FIG. 1C illustrates an operating environment in which fact management blockchain may be implemented in accordance with some embodiments of the subject technology.

FIG. 1C depicts a fact management blockchain operating environment 130 which may include connection endpoints to fact management system 102 and incorporate at least portions of operating environment 100, respectively discussed above.

Fact management blockchain operating environment 130 includes a fact management blockchain network 132 which manages a blockchain 134. In particular, blockchain 134 includes an immutable record of uploaded evidence (e.g., facts, premises, etc.) as well as interactions with the uploaded evidence and may be storage repository 106 discussed above. Fact management blockchain network 132 may include multiple nodes, at least some of which may store copies of blockchain 134 for individual auditing and/or validation (not depicted).

A human user 136 or an institutional user 138 provides a respective sourced fact to fact management blockchain network 132. In some examples, the upload process may convert the sourced fact into a multilayer content representation 122 as discussed above in reference to FIG. 1B. Further, user 136 or institution 138 provides to a premise tagging process 140 a citation to the uploaded sourced fact. For example, the citation may be in an article for publication or the like. Premise tagging process 140 retrieves premise support and audit trail for the citation from fact management blockchain network 132. Further, fact management blockchain network 132 may record the retrieval on blockchain 134. The citation (e.g., article for publication) is then provided to editors 142 along with auditable and interactable assertions. For example, a complete audit trail of the citation (and other citations) can be provided to editors 142 for review. In some examples, the auditable and interactable asserts are automatically provided to edits 142 or may be actively requested by edits 142 from premise tagging process 140.

Editors 142 may upload smart contract rules to fact management blockchain network 132 to be added to blockchain 134. A smart contract may provide for automated performance (or review of items related to terms) of agreements memorialized over fact management blockchain network 132. Smart contract rules can include terms such as encrypted sources related to the provided citation, which may be decrypted once certain terms are met such as an amount of time following publication, particular users providing support (e.g., via user reputation or via supporting evidence uploaded to blockchain network 132, etc.), once a reputation threshold is obtained by user 136 or institution 138, compensation schemes, particularized user visibility and access, and the like.

Additionally, edits 142 may retrieve user reputation information from a reputation management process 146 to, for example, vet user 136 or institution 138 (e.g., to determine trustworthiness of a premise, an article author, or terms for a smart contract, etc.). Reputation management process 146 retrieves user history data from fact management blockchain network 132 by, for example, reviewing user interaction records within blockchain 134. Further, reputation management process 146 may provide reputation information fact management blockchain network 132 (for example, to fulfill terms of a smart contract, etc.) or otherwise provide "oracle" services to fact management blockchain network 132.

Editors 142 provide fact support content to publication 144. The fact supported content can include a complete or partial audit trail of asserts and facts within the content based on interactions with fact management blockchain network 132 discussed above. Further, publication 144 may then be provided as, or provide, auditable and filterable published content to audience 150. In some examples, audience 150 can retrieve premise audit information through, for example, hyperlinks and the like within the auditable and filterable published content which allow audience 150 to interface with blockchain 134 via fact management blockchain network 132 (e.g., in a read-only mode, etc.). Further, in some examples, audience 150 may filter content from publication 144 based on fact management blockchain network 132 information such as, for example and without imputing limitation, evidence certification for evidence related to (e.g., cited within) the auditable and filterable published content, reputation information of user 136 and/or institution 138 (e.g., filter based on an article author reputation), and various other content features retrievable or discernible from fact management blockchain network 132.

FIG. 1D illustrates a certified evidence data packet 160 for transmitting evidence to and from, for example, storage repository 106. In particular, certified evidence data packet 160 includes information for auditing content provided by storage repository 106. Certified evidence data packet 160 can be included as an attachment to a respective evidence data or may itself include the respective evidence data and, in effect, be a wrapper data structure for transmitting the evidence data.

A content type field 162 identifies a type of content received (e.g., video, image, text, etc.). Layer content field 164 may include tokenized representation layer 14 or associated content and/or content representation layer 16 and/or associated content. In some examples, layer content field 164 directly includes the content associated with layers 14 and 16. In some examples, layer content field 164 may instead include location information (e.g., addresses, hashes, etc.) for retrieving layer contents from storage repository 106 and the like. A cross-references field 166 includes other evidence to which certified evidence data packet 160 is linked via, for example, implicit reliance, direct reference, etc. In some examples, the other evidence is linked by an address or other identifier for independent retrieval. Further, a metadata field 168 may include other information of use to transmission systems and or processing systems (e.g., values related to operating system, performance indicators, routing policies, etc.).

A source identification field 170 can include information identifying a source of the content (e.g., an individual user, a website, another data repository, etc.). An editor identification field 172 can include identification information for one or more editors associated with the evidence data. A logic validator field 174 identifies operations for performing validation on the evidence data (e.g., fallacy checks, time checks, etc.). Further, a workload identification field 176, workload process identification field 178, and workload completion date field 180 provide identifying information for workloads performed, by which device (or user), and a time of completion to, for example, provide an audit trail for those reviewing work performed on the evidence data. In some examples, additional (e.g., optional) fields can be included within certified evidence data packet 160.

Figure 2:
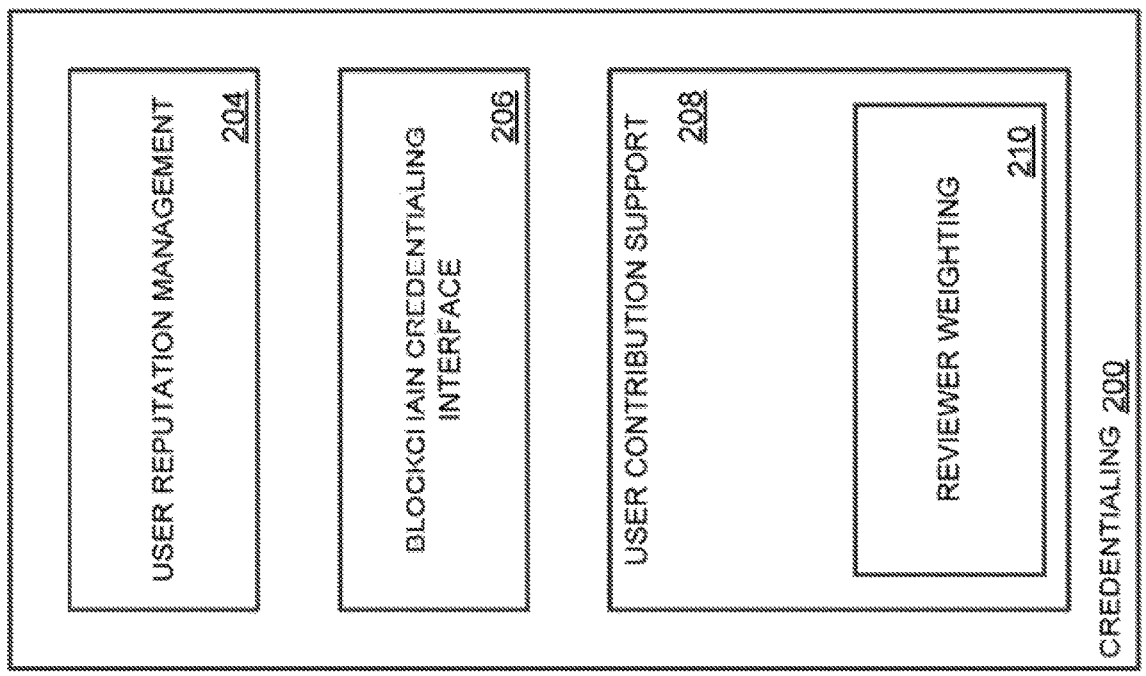
FIG. 2 is a block diagram depicting a credentialing system according to some embodiments of the subject technology.

FIG. 2 depicts a credentialing service 200 which may be substantially similar to credentialing service 114 discussed above. Credentialing service 200 includes a user reputation management process 204, a blockchain credentialing interface 206, a user contribution support process 208, and a reviewer weighting process 210. User reputation management process 204 may interface with a user portal, such as user portal 116, and the like and can provide training services, screening, and the like.

Blockchain credentialing interface 206 includes interface access and/or API endpoints for managing one or more blockchains. In some examples, blockchain credentialing interface 206 includes a blockchain service node or the like that is a member of a public or private blockchain network.

User contribution support process 208 may include subservices and subsystems for managing users and/or assisting users in interacting with evidence data. For example, user contribution support process 208 includes a reviewer weighting subprocess 210 which can modify an effect of reviews on certification processes and the like. User contribution support process 208 may also exchange data with blockchain credentialing interface 206 in order to retrieve and/or store credentialing related data.

Figure 3:
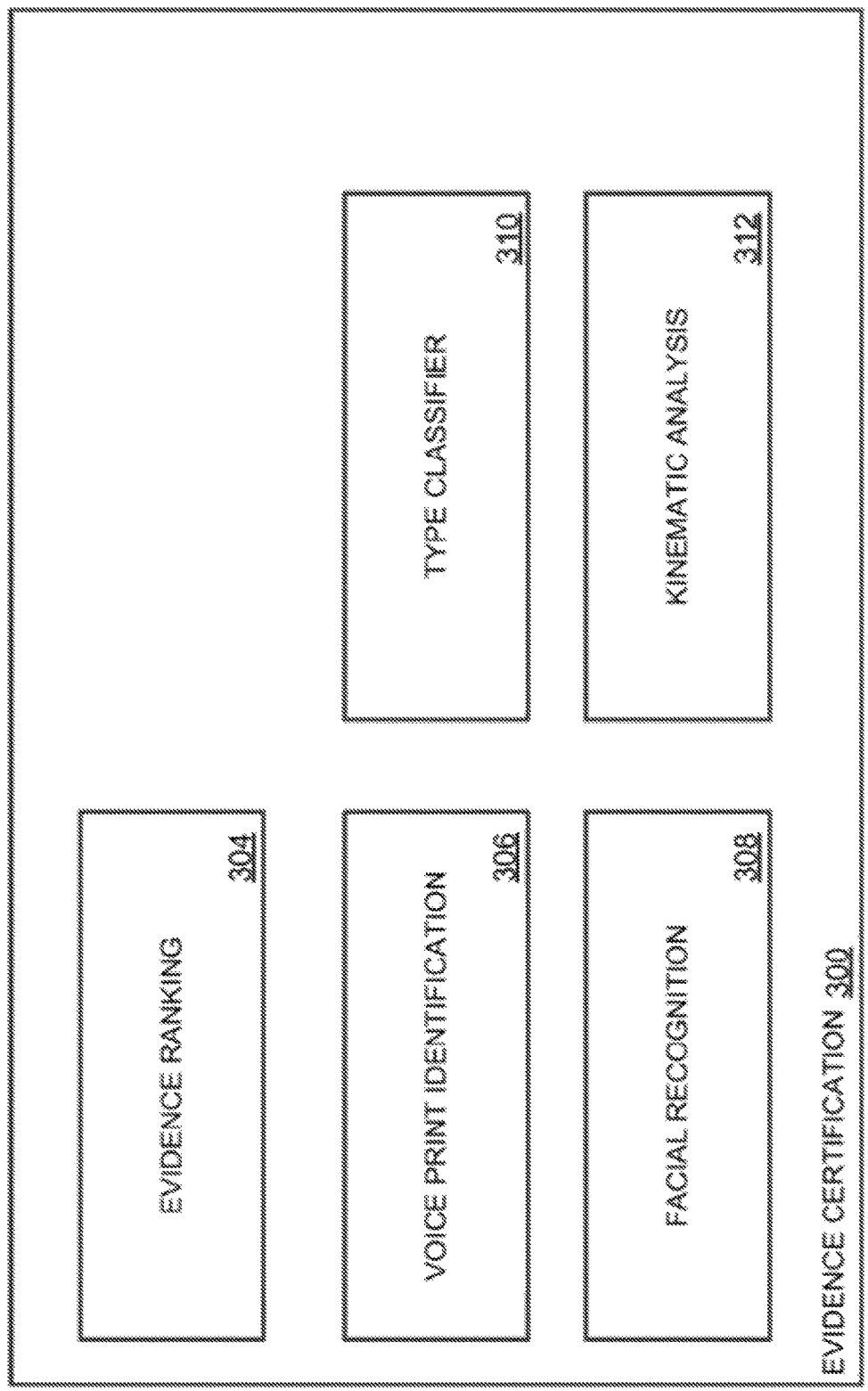
FIG. 3 is a block diagram depicting an evidence certification system according to some embodiments of the subject technology.

FIG. 3 depicts evidence certification service 300 which may include an evidence ranking process 304, a voice print identification process 306, a facial recognition process 308, a type classifier 310, and a kinematic analysis process 312. Processes of evidence certification service 300 may retrieve data from, for example, tokenized representation layer 14 of evidence. Evidence ranking process 304 may provide a sortable flag to evidence data based upon one or more types to which the evidence data conforms. Evidence data is assigned a type by type classifier 310, which may use natural language processing techniques and other processes of evidence certification system 300 to classify evidence data into one or more types as discussed above. Further, voice print identification process 306 provides voice print analysis and support (e.g., assigning a probability of veracity that evidence data is what it purports to be, etc.), which may also be used by ranking process 304. Facial recognition process 308 identifies individuals in evidence data such including video and/or image content. Kinematic analysis process 312 provides analytic support for video content of evidence in order to determine whether a video file has been tampered with and the like. In some examples, outputs of the above processes can feed back into tokenized representation layer 14 and/or into content representation layer 16 discussed above.

Figure 4:
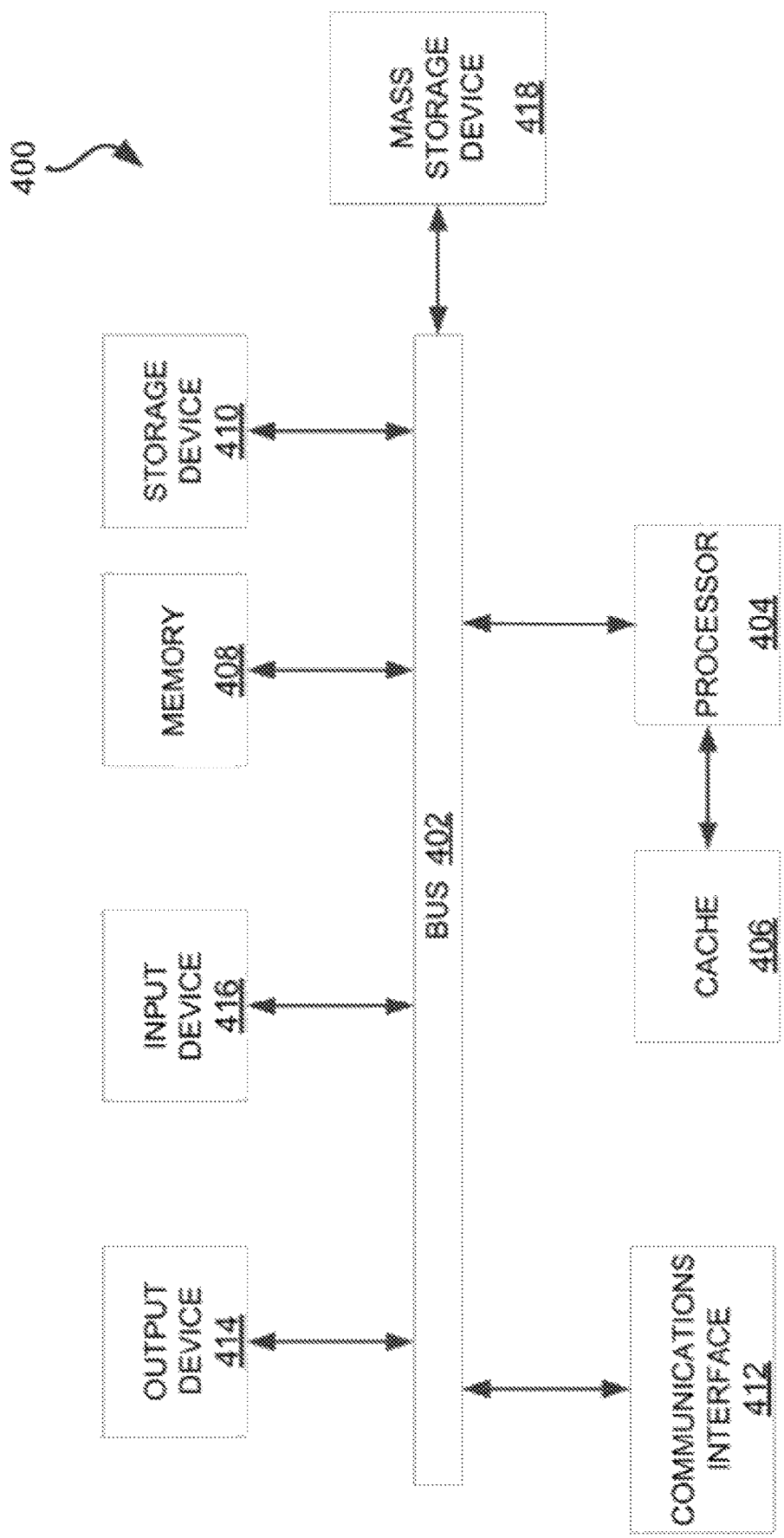
FIG. 4 is a system diagram of an exemplary computing system that may implement various systems and methods discussed herein, in accordance with various embodiments of the subject technology.

FIG. 4 is an example computing system 400 that may implement various systems and methods discussed herein. The computer system 400 includes one or more computing components in communication via a bus 402. In one implementation, the computing system 400 includes one or more processors 404. The processor 404 can include one or more internal levels of cache 406 and a bus controller or bus interface unit to direct interaction with the bus 402. The processor 404 may specifically implement the various methods discussed herein. Main memory 408 may include one or more memory cards and a control circuit (not depicted), or other forms of removable memory, and may store various software applications including computer executable instructions, that when run on the processor 404, implement the methods and systems set out herein. Other forms of memory, such as a storage device 410 and a mass storage device 418, may also be included and accessible, by the processor (or processors) 404 via the bus 402. The storage device 410 and mass storage device 418 can each contain any or all of the methods and systems discussed herein.

The computer system 400 can further include a communications interface 412 by way of which the computer system 400 can connect to networks and receive data useful in executing the methods and system set out herein as well as transmitting information to other devices. The computer system 400 can also include an input device 416 by which information is input. Input device 416 can be a scanner, keyboard, and/or other input devices as will be apparent to a person of ordinary skill in the art. An output device 414 can be a monitor, speaker, and/or other output devices as will be apparent to a person of ordinary skill in the art.

The system set forth in FIG. 4 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the methods can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer. The computer-readable storage medium may include, but is not limited to, optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions.

The description above includes example systems, methods, techniques, instruction sequences, and/or computer program products that embody techniques of the present disclosure. However, it is understood that the described disclosure may be practiced without these specific details.

While the present disclosure has been described with references to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for evidence management, the system comprising:
   a storage repository in memory that stores a plurality of evidence data files, each evidence data file including digital information associated with an approved source;
   an evidence certification process executed by a processor to determine a level of veracity of at least a first evidence data file of the plurality of evidence data files based on a veracity classifier;
   a credentialing process executed by the processor to record a history of one or more users associated with at least the first evidence data file of the plurality of evidence data files; and
   a multi-layered representation process executed by the processor to:
      generate a multi-layered representation of the first evidence data file based on the level of veracity of the first evidence data file and the history of one or more users associated with the first evidence data file, and
      output the multi-layered representation of the first evidence data file.

2. The system of claim 1, wherein each evidence data file of the plurality of evidence data files is associated with a digital citation.

3. The system of claim 1, wherein a recorded history of at least the first evidence data file of the plurality of evidence data files is immutable.

4. The system of claim 3, wherein the recorded history of at least the first evidence data file further includes a smart contract executable to provide automated source disclosure for at least the first evidence data file.

5. The system of claim 1, wherein the evidence certification process further includes a ranking process executable to assign a rank to each evidence data file of the plurality of evidence data files based on one or more evidence feature analytics.

6. The system of claim 5, wherein the rank is further based on a number of the evidence feature analytics that are applicable to at least the first evidence data file.

7. The system of claim 1, wherein the veracity classifier provides a validity value to at least the first evidence data file.

8. The system of claim 1, wherein at least a second evidence data file of the plurality of evidence data files is nested within or layered upon the first evidence data file, and wherein the storage repository further includes a cross reference identifying a nesting or layering relationship between the first evidence data file and the second evidence data file.

9. The system of claim 1, further comprising a content representation process executed by the processor to:
   analyze a content file to identify one or more portions of the content file that correspond to one or more evidence data files of the plurality of evidence data files; and
   generate a multi-layered representation of the content file based on the analyzing of the content file and based on the one or more evidence data files, wherein the multi-layered representation of the content file includes the multi-layered representation of the first evidence data file.

10. The system of claim 9, further comprising:
    a plagiarism detection process executed by the processor to certify the content file as original or properly attributed based on an analysis of the one or more portions of the content file.

11. The system of claim 9, further comprising:
    a premise tagging process executed by the processor to identify at least one of the one or more portions of the content file as a premise, retrieve at least one of the plurality of evidence data files identified as supporting the premise, and tag the premise in the content file based on the at least one of the plurality of evidence data files identified as supporting the premise.

12. The system of claim 11, wherein the premise tagging process is further executed by the processor to provide an audit trail based on at least the premise as tagged within the content file.

13. The system of claim 9, wherein the content file is published, and further comprising:
    a publication process executed by the processor to associate the published content file with the one or more evidence data files that correspond to the one or more portions, wherein the one or more evidence data files are accessible by a consumer of the content file via a browser interface.

14. The system of claim 13, further comprising:
    a filter executed by the processor to receive a filter parameter and filter the one or more data files based on the filter parameter.

15. The system of claim 14, wherein the filter is further executed by the processor to filter the history record for each of the one or more evidence data files based of the received filter parameter.

16. The system of claim 1, further comprising:
    a reputation management process executed by the processor to manage one or more respective reputation scores for the one or more users associated with at least the first evidence data file of the plurality of evidence data files.

17. The system of claim 16, wherein the reputation management process is further executed by the processor to build the one or more respective reputation scores for the one or more users based on one or more mining operations.

18. The system of claim 16, wherein the reputation management process is further executed by the processor to filter the one or more respective reputation scores for the one or more users based on a received filter parameter.

19. The system of claim 1, further comprising:
    a source monitoring process executed by the processor to detect one or more historical changes to the first evidence data file of the plurality of evidence data files by at least one of the one or more users, wherein the one or more historical changes are recorded by the credentialing process in association with the first evidence data file, wherein the multi-layered representation of the first evidence data file is generated also based on the one or more historical changes to the first evidence data file.

20. The system of claim 1, wherein the generation of the multi-layered representation of the first evidence data file includes processing of the first evidence data file for verification or validation as the multi-layered representation of the first evidence data file.

21. A method for evidence management, the method comprising:
- storing a plurality of evidence data files in a storage repository in memory, each evidence data file including digital information associated with an approved source;
- executing an evidence certification process, wherein execution of the evidence certification process by a processor determines a level of veracity of at least a first evidence data file of the plurality of evidence data files based on a veracity classifier;
- executing a credentialing process, wherein execution of the credentialing process by the processor records a history of one or more users associated with at least the first evidence data file of the plurality of evidence data files;
- generating a multi-layered representation of the first evidence data file based on the level of veracity of the first evidence data file and the history of one or more users associated with the first evidence data file; and
- outputting the multi-layered representation of the first evidence data file.

22. The method of claim 21, further comprising:
executing a source monitoring process, wherein execution of the source monitoring process by the processor detects one or more historical changes to the first evidence data file of the plurality of evidence data files by at least one of the one or more users, wherein the one or more historical changes are recorded by the credentialing process in association with the first evidence data file, wherein the multi-layered representation of the first evidence data file is generated also based on the one or more historical changes to the first evidence data file.

23. A non-transitory, computer-readable storage medium, having embodied thereon a program executable by a processor to perform a method for fact management, the method comprising:
- storing a plurality of evidence data files in a storage repository in memory, each evidence data file including digital information associated with an approved source;
- executing an evidence certification process, wherein execution of the evidence certification process by a processor determines a level of veracity of at least a first evidence data file of the plurality of evidence data files based on a veracity classifier;
- executing a credentialing process, wherein execution of the credentialing process by the processor records a history of one or more users associated with at least the first evidence data file of the plurality of evidence data files;
- generating a multi-layered representation of the first evidence data file based on the level of veracity of the first evidence data file and the history of one or more users associated with the first evidence data file; and
- outputting the multi-layered representation of the first evidence data file.

* * * * *